United States Patent [19]

Vail et al.

[11] Patent Number: 5,441,641

[45] Date of Patent: Aug. 15, 1995

[54] PROCESS FOR REMOVING MANGANESE FROM SOLUTIONS INCLUDING AQUEOUS INDUSTRIAL WASTE

[76] Inventors: William J. Vail, 102 Winslow St., Cumberland, Md. 21502; Robert K. Riley, P.O. Box 284, Midland, Md. 21542

[21] Appl. No.: 169,741

[22] Filed: Dec. 17, 1993

Related U.S. Application Data

[63] Continuation of Ser. No. 912,814, Jul. 13, 1992, abandoned.

[51] Int. Cl.⁶ ................................................ C02F 3/34
[52] U.S. Cl. ....................... 210/611; 210/617; 210/620; 210/747; 210/912; 435/262
[58] Field of Search ............ 210/610, 611, 612, 615, 210/617, 620, 631, 722, 747, 912; 435/262, 264

[56] References Cited

U.S. PATENT DOCUMENTS

| | | | |
|---|---|---|---|
| 3,349,031 | 10/1967 | Hatch et al. | 210/722 |
| 3,923,597 | 12/1975 | Chakrabarty et al. | 210/611 |
| 4,124,501 | 11/1978 | Yen et al. | 210/611 |
| 4,200,523 | 4/1980 | Balmat | 210/611 |
| 4,218,318 | 8/1980 | Niimi et al. | 210/170 |
| 4,293,333 | 10/1981 | Drobot | 210/601 |
| 4,354,937 | 10/1982 | Hallberg | 210/607 |
| 4,401,569 | 8/1983 | Jhaveri et al. | 210/747 |
| 4,468,461 | 8/1984 | Bopp | 210/611 |
| 4,519,912 | 5/1985 | Kauffman et al. | 210/611 |
| 4,519,913 | 5/1985 | Baldwin et al. | 210/611 |
| 4,522,723 | 6/1985 | Kauffman et al. | 210/912 |
| 4,530,763 | 7/1985 | Clyde et al. | 210/912 |
| 4,576,717 | 3/1986 | Collin et al. | 210/747 |
| 4,728,427 | 3/1988 | Revis et al. | 210/611 |
| 4,755,304 | 7/1988 | Hallberg et al. | 210/617 |
| 4,789,478 | 12/1988 | Revis et al. | 210/912 |
| 4,793,929 | 12/1988 | Kickuth et al. | 210/617 |
| 4,898,827 | 2/1990 | Brierley et al. | 210/601 |
| 5,062,956 | 11/1991 | Lupton et al. | 210/611 |
| 5,062,958 | 11/1991 | Bateson et al. | 210/617 |
| 5,080,793 | 1/1992 | Urlings | 210/617 |

OTHER PUBLICATIONS

Bureau of Mines Information Circular/1988; vol. 1: Mine Water and Mine Waste; Isolation and Culture of Manganese-Oxidizing Bacterium from a Man-Made Cattail Wetland; Vail, Wilson and Riley.

*Primary Examiner*—Christopher Upton
*Attorney, Agent, or Firm*—Ware, Fressola, Van Der Sluys & Adolphson

[57] ABSTRACT

A process is provided for reducing the concentration of water soluble ionic manganese species in aqueous waste solutions containing the same. The process comprises passing said waste solution through a treatment zone containing a porous matrix on which are retained populations of at least one manganese oxidizing bacterium, such as members of the genus Metallogenium. The passing of said aqueous solution through said treatment zone is carried out at predetermined rates of flow, and contact between said solution and said bacteria is conducted under aerobic conditions and at predetermined pH and temperature levels. The process provides for the conversion of water soluble ionic manganese species to water insoluble manganese oxides, which are retained on the porous matrix and can be recovered therefrom.

25 Claims, 2 Drawing Sheets

PROCESS FOR REMOVING MANGANESE FROM SOLUTIONS INCLUDING AQUEOUS INDUSTRIAL WASTE

This is a continuation of application Ser. No. 07/912,814 filed on Jul. 13, 1992, now abandoned.

BACKGROUND-FIELD OF THE INVENTION

This invention relates to a process for reducing the concentration of water soluble ionic manganese species in aqueous solutions, and in particular, the present invention relates to a process for the removal of manganese ions from aqueous solutions such as mine discharge waters or spent leaching waters prior to the discarding of such waters into surface or ground water systems. The invention also provides for the recovery of manganese, as an oxide of manganese.

BACKGROUND-DESCRIPTION OF PRIOR ART

The water resources for this country are important for the health and quality of life for its population. For more than a hundred years the water quality has been reduced by industrial pollution and deep mining and more recently surface mining. Deep and surface mining pollution of the water systems have been especially prevalent in the coal regions of the Appalachian mountains. The pollutants resulting from these mines include iron, sulfate, manganese, aluminum, and acidity to name a few. The toxicity of these pollutants both impact health and recreation in these areas.

A current method used to reduce the ionic and acid pollution of these waters is to raise the pH above 8.5 with caustic soda. The ions then precipitate from solution as hydroxides and the high pH supernatant is then discharged into streams. This process requires continuous maintenance and replenishment of caustic soda.

Recently, microorganisms have been used to reduce the concentration of pollutants from both industrial wastes and mining. There have been many reports that bacteria can be used to remove metals as sulfides and sulfates from industrial and mining wastes.

Sulfate can be removed using sulfate reducing bacteria in an anaerobic system (Yen et al. U.S. Pat. No. 4,124,501, and Balmat U.S. Pat. No. 4,200,523). Using similar methodology, sulfate reducing bacteria grown under anaerobic conditions yield hydrogen sulfide gas which will precipitate out metals as metal sulfides (Hallberg U.S. Pat. No. 4,354,937). Revis et al. (U.S. Pat. No. 4,789,478) used a mixed culture of *Citrobacter freundii* and sulfate reducing bacteria and precipitated heavy metal ions in their sulfide form. Kauffman et al. (U.S. Pat. No. 4,522,723) were able to precipitate out metals as their sulfide species using sulfate reducing bacteria of the genera Desulfovibro and Desulfotomaculum.

Another approach was taken by Lupton et al. (U.S. Pat No. 5,062,956). Using anaerobic sulfate reducing bacteria they were able to precipitate chromium as an insoluble hydroxide since the removal of sulfate causes a rise in pH. Kauffman et al. (U.S. Pat No. 4,519,912) were able to remove sulfate and heavy metals from aqueous solutions using mixed cultures of anaerobic bacteria of the genus Clostridium and at least one other bacteria from the genera Desulfovibrio and Desulfotomaculum. These workers also used a treatment zone to carry out the removal of water soluble species of heavy metals including selenium and sulfate ions. A further patent by Baldwin et al. (U.S. Pat. No. 4,519,913) used a porous matrix which retained a population of bacterium of the genus Clostridium to reduce the concentration of the water soluble ionic selenium species. Again the bacteria were grown under anaerobic conditions and defined temperature and pH conditions.

There have been several reports of using aerobic microorganisms to reduce the concentrations of ions from waste water. Chakrabarty et al. (U.S. Pat. No. 3,923,597) used a genetically engineered species of Pseudomonas to remove mercury as a pollutant or impurity. Bopp (U.S. Pat. No. 4,468,461) was able to remove chromate from waste water using a strain of *Pseudomonas fluorescens*. Revis et al. (U.S. Pat. No. 4,728,427) was able to reduce the concentration of at least one heavy metal from an aqueous waste solution using a culture of *Pseudomonas maltophilia*. Brierley et al. (U.S. Pat. No. 4,898,827) were able to remove ionic species of Ag, Cu, Pb, Cr, and Ni from waste waters using *Bacillus subtilis* and recover these metals.

Metals could be recovered from aqueous solutions such as industrial waste water using several species of fungi (Drobot U.S. Pat. No. 4,293,333).

Clyde et al. (U.S. Pat. No. 4,530,763) describes a method of treating waste fluids to remove selected chemicals with bacteria attached to porous fiber webbing. Waste fluids containing nutrients are drawn through the porous fiber webbing supports and the ions removed from solution were Cr, Ur, Fe, Ag, Pd, and V.

Manganese can be chemically removed from waste water by the addition of bisulfite to precipitate the manganese as manganese dioxide (Hatch et al. U.S. Pat. No. 3,349,031).

We describe in this invention a microbiological process which removes ionic manganese species from aqueous waste solutions under aerobic conditions.

We have discovered that it is possible to reduce the concentration of manganese ions in aqueous solutions by contacting the aqueous solution with a bacterial population containing manganese oxidizing bacteria, such as a member of the genus Metallogenium, on a porous matrix under aerobic conditions. The bacteria are metabolically capable of producing insoluble manganese oxides which are retained on the porous matrix. The aqueous effluent is substantially lower in manganese ions.

This is an aerobic process in the presence of specific nutrients, temperature and pH which will provide a constant population of bacteria.

DETAILED DESCRIPTION OF THE INVENTION

A series of laboratory and field experiments were carried out to demonstrate the removal of manganese from water.

Experiment 1

A manganese oxidizing bacterium, in this case *Metallogenium*, was cultured on a porous matrix of limestone shale in 5 gallon plastic buckets, aerated by an aquarium pump and airstone using mine water containing 80 ppm manganese. Samples of water were obtained directly from a mine seep and after the seep water passed through a man-made cattail wetland. The seep water was poor in nutrients while the wetland water was rich in nutrients for the bacteria. The wetland water contained biological breakdown products of plant material including: cellulose, hemicellulose, hydrocarbons, pectin and pectic substances, starches, fructans, levans, inulins, sugars, proteins, amino acids, chitin, lignin, organic acids, and derivatives of these materials.

Figure 1:
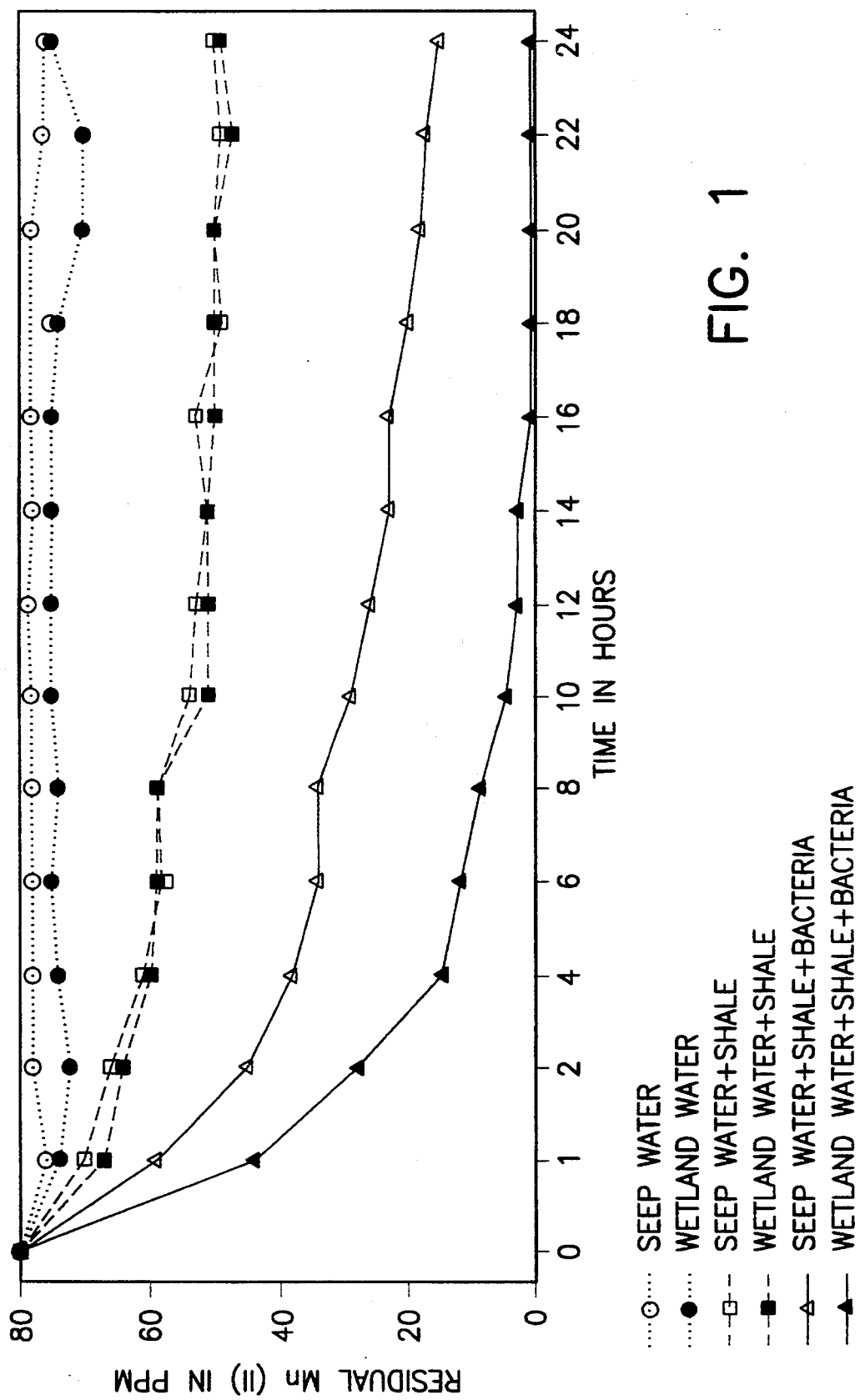
FIG. 1 is a graph showing the effect of wetland nutrients on bacterial removal of manganese for Experiment 1.

FIG. 1 is the effect of wetland nutrients on bacterial removal of manganese from water. It can be clearly seen from FIG. 1 that the most effective removal was from wetland water and shale inoculated with manganese oxidizing bacteria. However, there was even a reduction of manganese in nutrient poor water with the same bacterium.

Experiment 2

A field experiment was conducted using a pit 100 feet long, 10 feet wide and 3 feet deep containing limestone shale comprising about two thirds of its volume as a treatment zone.

In order to prepare an inoculum for our field study site it was advantageous to grow the bacteris on a porous matrix of limestone shale in 5 gallon plastic buckets using water from that site. This enrichment technique selected a steady state population of bacteria that were site specific.

The limestone zone was inoculated with 20, 5 gallon buckets of manganese oxidizing bacteria, in this case including Metallogenium, growing on shale. The inlet water running into the pit came from a man-made cattail wetland which contained about 40 ppm manganese ions and was nutrient rich. The pH of the untreated water was about 4.5. The retention time for this water in the treatment zone was about 2.5 days at a flow rate of 2 gallons per minute. This system contained well aerated water.

Figure 2:
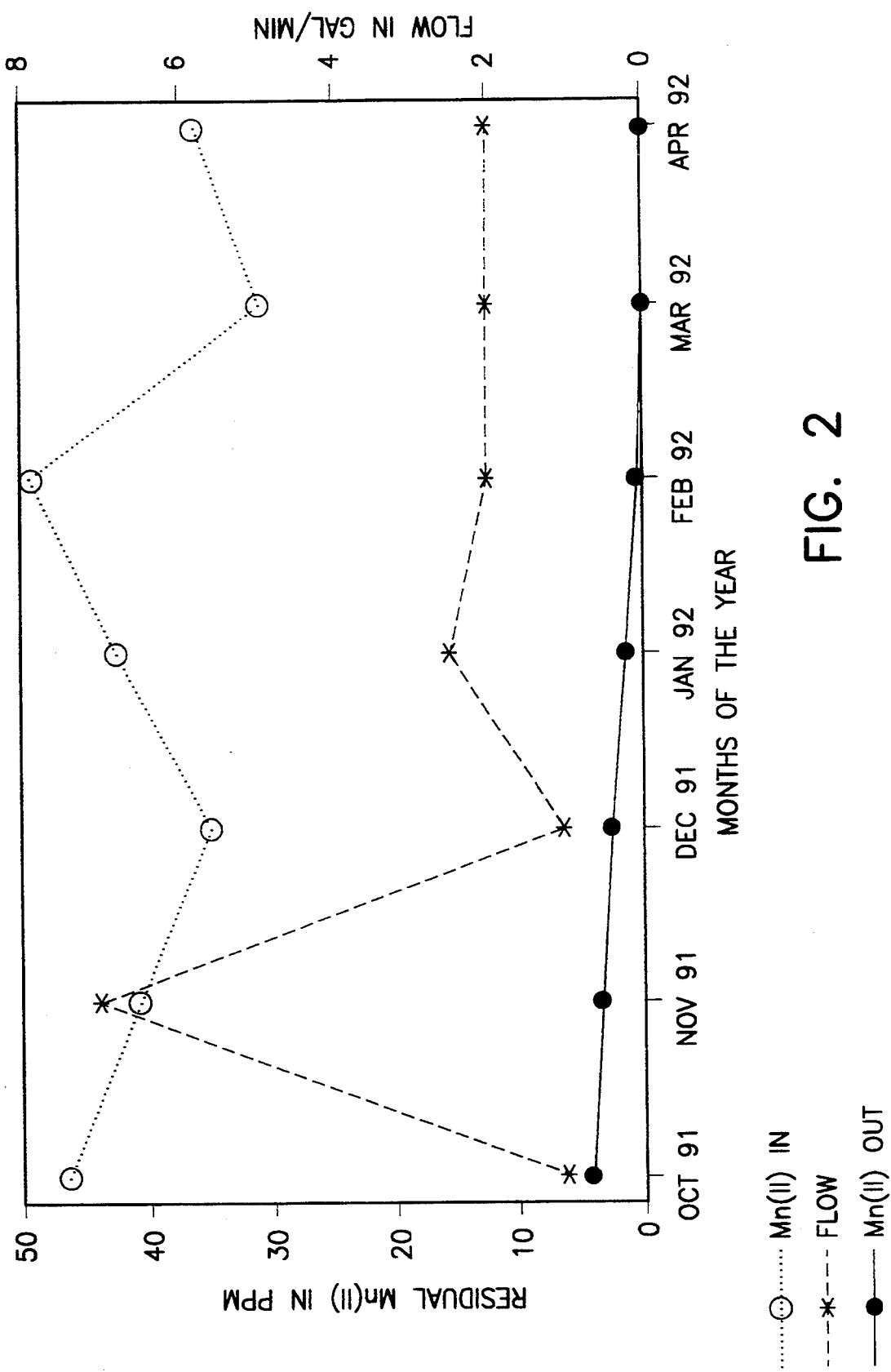
FIG. 2 is a graph showing the removal of manganese during he field study of Experiment 2.

FIG. 2 shows manganese concentration taken at the inlet of the treatment zone [Mn (II) IN] compared with the outlet [Mn (II) OUT] over a 7 month period. During a 7 month period there was significant removal of manganese even during the cold winter months.

The following non-limiting examples are presented as being illustrative of the present invention.

From the foregoing descripion one can easily ascertain the essential characteristics of this invention and, without departing from the spirit thereof, can make various changes and modifications of this invention to adapt to various usages and conditions.

We claim:

1. A process for reducing the concentration of water soluble manganese ions in an aqueous solution containing the same, said process comprising the steps of:
   providing an aqueous solution having contained therein a concentration of water soluble manganese ions;
   providing a porous matrix containing cultured populations of aerobic manganese oxidizing bacteria from the genus Metallogenium, said bacteria being capable of metabolizing said water soluble manganese ions in said aqueous solution into water insoluble manganese oxides, said porous matrix being provided under aerobic conditions; and
   passing said aqueous solution through said porous matrix in a continuous fashion so as to allow said bacteria to metabolize said manganese ions in said aqueous solution into water insoluble manganese oxides, which are substantially retained on said porous matrix, thereby resulting in a reduction in the concentration of said water soluble manganese ions in said aqueous solution.

2. The process of claim 1 wherein the manganese ions in said aqueous solution are in the Mn (II) and Mn (IV) oxidation states.

3. The process of claim 1 wherein the pH of the aqueous solution containing said manganese ions ranges from about 4.0 to about 8.0.

4. The process of claim 1 wherein said water insoluble manganese oxides, substantially retained on the porous matrix are deposited on or among the bacteria contained on said matrix.

5. The process of claim 1, wherein said aqueous solution contains up to 80 parts per million (ppm) of water soluble manganese ions and wherein said aqueous solution is continuously passed through said matrix at a rate up to about 2 gallons of aqueous solution per cubit foot of matrix per day, whereby said aqueous solution after passing through said matrix contains water soluble manganese ions at a concentration no greater than 4.0 ppm.

6. The process of claim 5 wherein the passing of said aqueous solution through said porous matrix containing said bacteria is carried out in the presence of at least one nutrient comprising an organic carbon source and in the presence of at least one trace nutrient.

7. The process of claim 6 wherein said nutrient comprising an organic carbon source is at least one material selected from the group consisting of yeast extract, malt extract, peptone, cellulose, hemicellulose, hydrocarbons, pectin and pectic substances, starches, fructans, levans, inulins, sugars, proteins, amino acids, chitin, lignin, organic acids, derivatives of said materials, and biological and municipal waste water sludges.

8. The processes of claim 7 wherein the passing of said aqueous solution through said porous matrix containing said bacteria in the presence of said nutrients is carried out at a temperature ranging from about 32° F. to about 90° F.

9. The process of claim 5 further comprising continuously drawing an aqueous effluent from said porous matrix, wherein said aqueous effluent contains a reduced concentration of said water insoluble manganese ions not exceeding 4.0 ppm.

10. The process of claim 1 further comprising separating and recovering said water insoluble manganese oxides from said porous matrix.

11. A continuous process for substantially reducing the concentration of water soluble manganese ions in an aqueous solution containing the same, said process comprising the steps of:
   providing an aqueous solution having contained therein a concentration of water soluble manganese ions, said aqueous solution having a pH range from about 4 to about 8;
   providing a porous matrix containing cultured populations of aerobic manganese oxidizing bacteria from the genus Metallogenium, said bacteria being capable of metabolizing said water soluble manganese ions in said aqueous solution into water insoluble manganese oxides, said porous matrix being provided under aerobic conditions;
   continuously passing said aqueous solution through said porous matrix at a rate of flow up to about 2 gallons of aqueous solution per cubic foot of the porous matrix per day, in the presence of at least one nutrient comprising an organic carbon source, wherein said nutrient is at least one material selected from the group consisting of yeast extract, malt extract, peptone, cellulose, hemicellulose, hydrocarbons, pectin and pectin substances, starches, fructans, levans, inulins, sugars, proteins, amino acids, chitin, lignin, organic acids, derivatives of said materials, and biological and municipal waste water sludges, and in the presence of at least one trace nutrient at a temperature ranging from about 32° F. to about 90° F., said nutrients and said temperature providing for the growth and steady state population density of the Metallogenium genus bacteria on said matrix, so as to allow said manganese oxidizing Metallogenium genus bacteria to come into contact with said manganese ions in said aqueous solution and thereby allow said manganese oxidizing bacteria to metabolize said water soluble manganese ions into water insoluble manganese oxides, which are deposited on or among said bacteria contained on said porous matrix; and continuously drawing an aqueous effluent from said porous matrix, wherein said aqueous effluent contains a significantly reduced concentration of said water soluble manganese ions.

12. The process of claim 11 further comprising separating and recovering said water insoluble manganese oxides from said porous matrix.

13. The process of claim 11 wherein said aqueous solution is mine discharge water.

14. The process of claim 11 wherein said porous matrix is comprised of at least gravel, shale or limestone chips to which said cultured populations of Metallogenium genus aerobic manganese oxidizing bacteria have been added, and wherein said porous matrix is contained in a treatment zone under aerobic conditions.

15. The process of claim 4 wherein said aqueous solution is continuously passed through said porous matrix contained in said treatment zone under aerobic conditions, at a rate of flow ranging from 1 to 2 gallons of aqueous solution per cubic foot of the porous matrix per day.

16. The process of claim 15 wherein the passing of said aqueous solution through said porous matrix in said treatment zone is carried out at a temperature ranging from about 32° F. to about 90° F. and preferably ranging from about 50° F. to about 85° F.

17. A process for reducing the concentration of water soluble manganese ions in an aqueous solution containing the same, said process comprising the steps of:

providing an aqueous solution having contained therein a concentration of water soluble manganese ions;

providing a porous matrix suitable for maintaining a population of aerobic manganese oxidizing bacteria from the genus Metallogenium, said porous matrix being provided under aerobic conditions;

inoculating said porous matrix with a population of aerobic manganese oxidizing Metallogenium genus bacteria, wherein said bacteria population is capable of metabolizing said water soluble manganese ions in said aqueous solution into water insoluble manganese oxides; and passing said aqueous solution through said porous matrix in a continuous fashion so as to allow said bacteria to metabolize said manganese ions in said aqueous solution into water insoluble manganese oxides, thereby resulting in a reduction in the concentration of said manganese ions in said aqueous solution.

18. The process of claim 7 wherein said aqueous solution is mine discharge water.

19. The process of claim 18 wherein said porous matrix is a matrix of alkaline based material.

20. The process of claim 17 wherein said step of passing said aqueous solution in a continuous fashion comprises allowing said aqueous solution to continuously flow through said porous matrix at a controlled rate.

21. A process of claim 20 wherein said controlled rate is determined by gravity.

22. A process for reducing the concentration of water soluble manganese ions in a body of water containing the same, said process comprising the steps of:

locating a body of water having contained therein a concentration of water soluble manganese ions;

constructing a treatment zone in the form of a basin having an inlet port through which water from said body of water may flow into said basin and an outlet port through which water contained in said basin may flow out of said basin, said inlet port and said outlet port being located and configured so as to allow said water to flow substantially throughout the entirety of said basin at a controlled rate;

filling said treatment zone with a porous matrix suitable for maintaining a population of aerobic manganese oxidizing bacteria from the genus Metallogenium thereon;

inoculating said porous matrix with a population of aerobic manganese oxidizing Metallogenium genus bacteria, wherein said bacteria population is capable of metabolizing said water soluble manganese ions in said body of water into water insoluble manganese oxides; and allowing water from said body of water to flow through said treatment zone, and hence through said porous matrix inoculated with said aerobic manganese oxidizing Metallogenium genus bacteria, in a continuous fashion so as to allow said bacteria to metabolize said manganese ions in said flowing water into water insoluble manganese oxides, thereby resulting in an overall decrease in the concentration of said manganese ions in water flowing out of said treatment zone as compared to water flowing into said treatment zone.

23. The process of claim 22 wherein said body of water is mine discharge water.

24. The process of claim 22 wherein said controlled rate is determined by gravity.

25. The process of claim 22 wherein said porous matrix is a matrix of alkaline based material.

* * * * *